Patented Dec. 19, 1944

2,365,291

UNITED STATES PATENT OFFICE 2,365,291

STABILIZING AGENTS FOR HYDROCARBON COMPOSITIONS AND THE LIKE

Carl F. Prutton, Cleveland Heights, Albert K. Smith, Shaker Heights, and Delton R. Frey, East Cleveland, Ohio, assignors to The Lubri-Zol Corporation, Cleveland, Ohio, a corporation of Ohio No Drawing. Application May 26, 1941, Serial No. 395,234

5 Claims. (Cl. 260—461)

This invention relates, as indicated, to new compositions of matter, and more particularly to certain new materials found to be useful in the stabilization of hydrocarbon compositions. Such materials comprise certain compounds of the type resulting from the reaction of a phosphorus containing reagent with certain organic compounds.

The term "hydrocarbon compositions" as used herein is intended to include liquid compositions which are essentially derivatives of petroleum, naturally occurring oils of the type represented by animal, vegetable and marine oils, and derivatives of the same. Such is also intended to include the various lubricating oils which are usually essentially mineral oil. The materials of this invention have additionally been found to be applicable to the stabilization of lighter fractions of petroleum of the type employed as fuels.

It is well known that liquid hydrocarbon compositions of the character above-identified are subject to various types of deterioration as by oxidation and polymerization, for example, during storage and handling, deterioration of such compositions generally proceeding at a more rapid rate during use of the same.

For example, the various oils mentioned above and the lighter fractions used as fuels have a tendency on storage to oxidize, polymerize, or otherwise deteriorate to form gums and the like; and when such compositions are used, particularly under conditions of high temperature, deterioration proceeds at a more rapid rate to the production of gums, sludges and other oxidation and/or polymerization products. This deterioration is manifested by discoloration of the liquid hydrocarbon body; the generation within the body of flocculant material; the precipitation from the body of the more serious types of deterioration products, such as sludge, and the deposit of varnish or shellac-like deposits on metallic surfaces with which the compositions come in contact during use.

Liquid hydrocarbon compositions, such as refined mineral oil, when employed for use as lubricants in internal combustion engines whether of the ignition or Diesel type are generally subject to the various conditions above named which tend to cause deterioration of such oil composition. Oxidation and/or sludging of liquid hydrocarbon compositions employed as lubricants in such engines is usually accelerated by the relatively high temperatures to which such compositions are subjected. This is particularly true in engines of the Diesel type in which the operating temperatures are generally somewhat higher than those in the so-called ignition type.

It is a principal object of our invention, therefore, to provide certain new materials and methods of making the same, such materials being useful in various ways, and particularly for the stabilization of compositions of the character above defined, in order to reduce the tendency of the same to decompose, particularly in the manner discussed.

Other objects of our invention will appear as the description proceeds.

Broadly stated, this invention comprises the provision of certain new compositions resulting from the reaction of a hydroxy ester or an organic hydroxy acid with a phosphorus containing reagent which preferably comprises phosphorus in tri-valent form. Such phosphorus containing reagent may advantageously also contain a halogen. The invention also comprises certain derivatives of these reaction products, more specifically defined below. All such products and derivatives have been found effective to improve the properties of liquid hydrocarbon compositions of the character previously identified, and particularly to stabilize such compositions under conditions of use.

As hereinafter more fully explained, for the stabilization of certain types of liquid hydrocarbon compositions and especially when the same are used for certain specific purposes, certain derivatives of the aforesaid reaction product or products or portions thereof, which derivatives may be prepared, for example, by halogenation, esterification, and/or treatment with an alkali or other base to form a salt, or ester-salt have been found most effective.

As previously stated, our invention contemplates the provision, as new compositions of matter, of the products resulting from a specified reaction. We therefore list below specific examples of the two classes of reactants which may be employed in the preparation of the product which we employ as the stabilizing addition agent.

*The phosphorus containing reactants*

Any material which contains phosphorus and which material will react with a hydroxy ester or an organic hydroxy-acid, may be used as the phosphorus containing reactant. Examples of such reactants are as follows:

Phosphorus trioxide, $P_4O_6$
Phosphorus tetroxide, $P_2O_4$
Phosphorus pentoxide, $P_2O_5$
Phosphorus oxychloride, $POCl_3$
Phosphorus oxybromide, $POBr_3$
Phosphorus trioxytetrachloride, $P_2O_3Cl_4$
Phosphorus oxyfluoride, $POF_3$
Phosphorus pentachloride, $PCl_5$
Phosphorus pentabromide, $PBr_5$
Phosphorus pentafluoride, $PF_5$
Phosphorus chloride, $P_2Cl_4$
Phosphorus pentasulfide, $P_2S_5$
Phosphorus trisulfide, $P_4S_6$
Phosphorus sesquisulfide, $P_4S_3$
Phosphorus disulfide, $P_3S_6$
Phosphorus heptasulfide, $P_4S_7$
Phosphorus thiochloride, $PSCl_3$
Phosphorus thiobromide, $PSBr_3$
Phosphorus thiobromide, $P_2S_3Br_4$
Phosphorus sulfoxide, $P_4S_4O_6$
Phosphorus pentaselenide, $P_2Se_5$
Phosphorus triselenide, $P_2Se_3$
Phosphorus thioamide, $PS(NH)_3$
Phosphorus thiocyanate, $P(CNS)_3$
Phosphorus triamide, $PO(NH_2)_3$ As indicated above, a preferred class of reagents are those materials which contain phosphorus in tri-valent form and a halogen, and which will react with a hydroxy ester. Of these phosphorus and halogen containing reactants phosphorus trichloride, $PCl_3$, will be found to be particularly useful and productive of suitable addition agents. Other reactants of this class are as follows:

Phosphorus tri-bromide, $PBr_3$
Phosphorus tri-fluoride, $PF_3$
Phosphorus tri-iodide, $PI_3$
Phosphorous oxy-chloride, $POCl$
Phosphorous sulpho-chloride, $PSCl$
Halogen derivatives of phosphine and organic substituted phosphines, e. g.

Phosphenyl chloride, $(C_6H_5)PCl_2$
Compounds of the classes:

(a) $RPCl_2$ and $RR'PCl$, and
(b) $ROPCl_2$ and $(RO)(R'O)PCl$ in which R and R' are organic radicles such as:

Aromatic, e. g.

Phenyl
Cyclohexyl phenyl
Alkylated phenyl

Aliphatic, e. g.

Lauryl
Cetyl

Cycloaliphatic, e. g.

Cyclopentyl
Cyclohexyl
Methyl-cyclohexyl

*The hydroxy esters*

The esters which are suitable for use as one of the components of the reaction with phosphorus containing reactants in the preparation of the stabilizing addition agent of our invention may, for example, be any of the esters produced by reacting any of the alcohols, and preferably any of the mono- or di-hydroxy low molecular weight alcohols, such as any of the following:

Methyl alcohol
Ethyl alcohol
Propyl alcohol
Butyl alcohol
Ethylene glycol
Propylene glycol
Trimethylene glycol
Cyclohexanol
Methyl cyclohexanol
Benzyl alcohol
Furfuryl alcohol
Sterols (e. g. cholesterol)

with any organic hydroxy-acid, and preferably with any saturated monobasic or polybasic hydroxy-fatty acid such as any of the following:

(1) Monobasic acids:

(a) Monohydroxy: e. g.

Glycollic acid
Lactic acid
Hydracrylic acid
Hydroxybutyric acids
Ricinoleic acid
Hydroxystearic acid
Chlorhydroxystearic acid
Hydroxyphenylstearic acid
Salicylic acid
p-Hydroxybenzoic acid
Hydroxy naphthoic acids (b) Polyhydroxy: e. g.

Glyceric acid
Dihydroxy palmitic acid
Dihydroxystearic acid (2) Polybasic acid (a) Monohydroxy: e. g.

Tartronic acid
Malic acid
Citramalic acid
Citric acid
Hydroxy-phthalic acids (b) Polyhydroxy: e. g.

Tartaric
Trihydroxy glutaric acid

Specific examples of esters of organic hydroxy acids which may be used for our purpose are as follows:

Methyl lactate
Ethyl lactate
Butyl lactate
Lauryl lactate
Cyclohexyl lactate
Methyl-cyclohexyl lactate
Cholesterol lactate
Benzyl lactate
Dibutyl tartrate
Dicyclohexyl tartrate
Dilauryl tartrate
Trimethyl citrate
Tributyl citrate
Trilauryl citrate
Tricyclohexyl citrate
Lauryl glycolate
Methyl-cyclohexyl glycolate
Methyl hydracrylate
Ethyl hydracrylate
Butyl hydracrylate
Lauryl hydracrylate
Methyl-cyclohexyl hydracrylate Ethyl hydroxy-butyrate (ethyl ester of "oxybutyric acid")
Amyl hydroxy butyrate
Lauryl hydroxy butyrate
Cyclohexyl hydroxy butyrate
Benzyl hydroxy butyrate
Methyl ricinoleate
Methyl salicylate
Isopropyl salicylate
Butyl salicylate
Amyl salicylate
Lauryl salicylate
Cyclohexyl salicylate
Methyl-cyclohexyl salicylate
Amyl-cyclohexyl salicylate
Cholesterol salicylate
Lauryl glycerate
Amyl-cyclohexyl glycerate
Lauryl dihydroxy-palmitate This invention also contemplates the use of hydroxy esters which are formed by polyhydric alcohols combined with organic acids so as to leave at least one hydroxyl group of the polyhydric alcohol undisturbed, for example:

Ethylene glycol monostearate
Propylene glycol monopalmitate
Di-ethyleneglycol monostearate
Di-ethyleneglycol monobenzoate In general, the esters of the low molecular weight hydroxy-fatty acids are preferred.

We have found the methyl esters to be preferable for our purpose in most cases.

The following are illustrative of specific embodiments of our invention:

A material, which for purposes of convenience in referring to the same herein we shall designate as P. M. L., is prepared by the reaction of methyl lactate with $PCl_3$. The relative proportions of methyl lactate and $PCl_3$ used in the preparation of P. M. L. are given in the following table, as well as the properties of the end product.

EXAMPLE I (P. M. L.)

| | |
|---|---|
| Methyl lactate _____ parts by weight__ | 104 |
| $PCl_3$ _____ do____ | 45 |
| Weight of product _____ | 74.5 |
| Weight of material removed by distillation___ | 31.8 |
| Yield _____ per cent__ | 65 |
| Average mol. wt_____ | 312 |
| Boiling point _____ ° C__ | 230 |
| Melting point _____ Liquid at room temperature | |
| Sp. gr. at 20° C_____ | 1.252 |
| Ref. index at 26° C_____ | 1.4365 |
| Color _____ Light yellow | |
| Phosphorus _____ per cent__ | 10.9 |
| Chlorine _____ do____ | 1.12 |
| Acid No _____ | 415 |

Soluble to extent of about 1% in Penna. 150 (S. U. S. at 100° F.) neutral.

Completely miscible with water to which ethyl alcohol has been added.

The methyl lactate is placed in a reaction vessel equipped with an agitator and reflux condenser. The vessel and agitator are preferably of glass or enamel. The $PCl_3$ is added slowly and the temperature of the reactants maintained below 60° C. during the addition of the $PCl_3$. The mixture is stirred continuously during the addition of the $PCl_3$. The temperature of the reactants may be controlled by the rate of the addition of the $PCl_3$. After the addition of the $PCl_3$ is complete, the mixture is agitated until the temperature begins to decrease, indicating that the $PCl_3$ has reacted to some extent with the methyl lactate. The slow addition of $PCl_3$ accompanied by stirring until a decrease in temperature is noted insures against loss of $PCl_3$ whose boiling point is 76° C. and also gives a higher yield than when these precautions are not taken. After the temperature of the reactants has begun to drop, heat is applied and the temperature of the reactants is raised to 120° C. This temperature is maintained for 3 hours. A slight reaction is apparent until the mixture has been heated at 120° C. for about 2 hours and 45 minutes. The mixture is stirred continuously all during the time of adding the $PCl_3$ and maintaining at 120° C.

After completion of the reaction between the methyl lactate and $PCl_3$, i. e., after the mixture has been maintained at a temperature of 120° C. for about 3 hours, the end product may either be used as such as a stabilizing addition agent for liquid hydrocarbon compositions or the end product may be distilled at atmospheric pressure and all of the material which distills over at 130° C. or less may be discarded. Whether the end product as produced or the refined end product derived by removal of the more volatile products is used, depends largely upon the use for which the ultimate composition containing the stabilizing addition agent is designed. In general, the less volatile part of the reaction product, or that part which contains combined phosphorus, is preferred for our purpose.

We believe the reaction produces two general types of compounds:

(a) Chlorine-containing compounds, for example the type in which chlorine has been substituted for the hydroxyl group of the hydroxy-ester; and (b) Phosphorus-containing compounds, for example the type in which the hydroxyl group has lost hydrogen (which forms HCl with chlorine removed from the $PCl_3$) so that the oxygen of the hydroxyl group becomes attached to a phosphorus atom.

For example in the reaction of methyl lactate with $PCl_3$, part $a$ would be principally the methyl ester of chlor propionic acid and part $b$ principally esters of phosphorous acid such as

$$P(OC_2H_4COOCH_3)_3$$

and $POH(OC_2H_4COOCH_3)_2$. It appears that the constituents of the reaction product described as part $b$ are responsible for the stabilizing effect when the product is used in accordance with our invention. However, for most purposes, part $a$ is not deleterious, and for some purposes may even be advantageously included. Part $a$ is in general more volatile than part $b$ and may therefore be easily separated from the latter by distillation at atmospheric or sub-atmospheric pressure.

The specific properties given in the table captioned "Example No. I" are those for the refined material. Such material is particularly effective as a stabilizing agent for liquid hydrocarbon compositions such as lubricating oils and reference may be had to Patents Nos. 2,251,953 and 2,252,675 for specific data as to such use.

Another product which we shall hereinafter, for convenience, refer to as P. B. T. was made by reacting dibutyl tartrate with $PCl_3$ under substantially the conditions previously specified for the manufacture of P. M. L., and the following is a table giving the proportions by weight of the reactants used and the properties of the end product.

Example II (P. B. T)

| | |
|---|---|
| Dibutyl tartrate_____parts by weight__ | 65 |
| PCl₃_____do____ | 11.6 |
| Weight of product_____ | 60 |
| Weight of refined material_____ | 55.5 |
| Yield_____per cent__ | 90 |
| Boiling point_____degrees C__ | 235–245 |
| Melting point_____Liquid at room temperature | |

Tests on oils similar to those given above in connection with the study of the properties of P. M. L. were run using P. B. T., and the latter was found to be substantially as effective as P. M. L.

Another material which we shall hereinafter, for convenience, refer to as P. M. C., was made by the reaction of trimethyl citrate with PCl₃. The proportions of reactants used and the properties of the end product are given in the following table:

Example III (P. M. C.)

| | |
|---|---|
| Trimethyl citrate_____parts by weight__ | 500 |
| PCl₃_____do____ | 75 |
| Weight of product_____ | 480 |
| Weight of refined material_____ | 465 |
| Yield_____per cent__ | 92 |
| Melting point_____degrees C__ | 80–100 |

Tests on this material in oil to determine its effect similar to those tests previously given in connection with the study of the effect of P. M. L. were run and show that P. M. C. was similar to P. M. L., i. e., effective to retard deterioration of the oils. P. M. C. has a tendency to be corrosive with respect at least to certain of the more sensitive metals, and, therefore, when such metals are encountered it would be advisable to employ minor amounts of corrosion inhibitors, such as the alkyl and aryl phosphites, along with the P. M. C.

Our invention also contemplates the production for use as a stabilizing agent of the reaction products which may be prepared by either of the following methods, viz.:

(a) Reacting a phosphorus-containing reagent, preferably one which comprises phosphorus in tri-valent form and halogen, with a mixture of hydroxy esters, a mixture of organic hydroxy acids or a mixture of one or more hydroxy esters with one or more organic hydroxy acids.

(b) Reacting a phosphorus-containing reagent, preferably one which comprises phosphorus in tri-valent form and halogen, with one or two molecules of a hydroxy ester or an organic hydroxy acid per molecule of reagent and then completing the reaction with another reactant of the class consisting of hydroxy esters and organic hydroxy acids different from that which was initially employed.

The reaction products thus prepared are especially desirable for use for certain purposes on account of their complexity.

Very small amounts of our addition agents above identified, are effective, in most cases less than one percent, and usually a fraction of 1%, e. g. from about 0.001 to about 0.2% will be found most useful. For use in mineral lubricating oil (e. g. a motor oil for automobile, aviation, or Diesel engines) amounts from about 0.01% to about 0.1% are suitable, and usually about 0.03% is preferable.

As indicated above, our invention also contemplates the production and use of oil-soluble derivatives of the above-identified reaction products. (In this connection we are more particularly concerned with the phosphorus-containing constituents of such reaction products.) Such derivatives include the oil-soluble salts and ester-salts, which may be produced by substituting a metal or basic radicle for one or more of the alcohol-derived radicles of the ester. This is conveniently accomplished by partly or completely saponifying the reaction product with an alkali (e. g. sodium, potassium, ammonium, or substituted ammonium, hydroxides) in aqueous solution. Ester-salts may be formed by the partial saponification of esters of polybasic acids, e. g. the phosphorus-containing reaction product of PCl₃ with dibutyl-tartrate may be partly saponified with caustic soda to form the corresponding butyl-sodium ester-salt. Similar salts and ester-salts of metals other than the alkali metals may be formed directly by reacting the ester with the metallic base, or more readily by double-decomposition of the alkali salt (or ester-salt) with a salt of the other metal.

As above indicated, our new materials are suitable for the purpose of stabilizing liquid hydrocarbons generally, among which may be mentioned refined mineral oils of the character generally employed as lubricants, lighter fractions and cuts such as are employed as fuels in Diesel type engines and even lighter fractions and cuts which are commonly identified as gasoline. Other oils such as hydrogenated oils and voltolized oils may be similarly stabilized by the inclusion therein of the above-mentioned addition agents.

The liquid hydrocarbon compositions which may be stabilized by the use of the addition agents hereinbefore specified need not be pure hydrocarbons but may contain other addition agents such as extreme pressure addition agents on the order of halogen, phosphorus and/or sulfur compounds, as well as corrosion inhibitors, such as phosphorus compounds, etc. and other additions commonly employed, such as pour-point depressors and the like.

When a lighter fraction, as above indicated, is stabilized the addition agents commonly employed in such lighter fractions may also be present; as for example, the various "dopes" commonly employed in Diesel fuels, and anti-knock compounds commonly employed in gasolines such as tetra-ethyl lead, iron carbonyl, etc.

In general, the addition agents of this invention will not be found incompatible with commonly employed anti-oxidants such as are used in gasolines and the like.

There may, however, be certain of these other addition agents which might be found incompatible with the addition agents of the present invention and in such cases, of course, the incompatible addition agent, whatever it may be should be omitted, since it will usually be found that a compatible addition agent for the desired purpose may be discovered among others of those available.

Among the other addition agents with which the compounds of the present invention may be employed to advantage, as above stated, are the extreme pressure addition agents, such as the halogen, phosphorus and/or sulfur-containing compounds.

In general we have found that the new materials of the present invention do not detrimentally affect the extreme pressure characteristics of a mineral lubricating oil, for example, which characteristics are the result of the presence therein of the extreme pressure addition agents above named. Moreover, where the addition agents of the present invention have been tested in lubricating compositions which also contain certain other addition agents, the extreme pressure characteristics of the resultant composition have been somewhat improved and such improvement has been traceable to the presence therein of the compounds of the present invention.

Throughout the foregoing specification reference is made to "oil-soluble" and by such term, as used herein, it is intended to indicate the ability of the addition agent to form not only true solutions with the oil to which the same is added, but also the ability to form therewith any form of substantially permanently homogeneous composition.

With certain of the more difficultly soluble addition agents to which this application relates, it may be advantageous to employ a mutual solvent as one means for increasing the "oil-solubility" of the addition agents and to also incorporate the addition agents in the oil base by special homogenizing apparatus, such as for example, that described in Cornell Patent No. 2,042,880.

Irrespective, therefore, of the manner in which the addition agent is incorporated in the liquid hydrocarbon, either as a true solution or a permanently stable homogeneous mixture, these various expedients are intended to be included by the term "oil-soluble," as employed herein. Furthermore, those addition agents which are not "oil-soluble" to any extent and which may not be incorporated in such a way as to effect any improvement in the oil, will obviously be excluded by the term "oil-soluble," as employed in the specification, where reference is made to their incorporation in lubricating oils and the like.

In general, the materials prepared in the manner specified will be sufficiently non-volatile so as to find usefulness for the purposes specified. In cases, however, where high temperatures are encountered, it will be best to select those which will neither substantially evaporate from the liquid hydrocarbon and those which will not be decomposed by the temperatures which the composition encounters in use. These limiting factors which must obviously be observed in the selection of any addition agent for use in liquid hydrocarbons are, therefore, intended to be included by the definition "stable" wherever used herein.

In the foregoing specification, reference has been made to optimum percentages within which the addition agents may be employed. It is within the contemplation of our invention, however, to admix the addition agents with the specified liquid hydrocarbons up to the limit of their solubility. This may be done advantageously in making concentrates, for example, to be blended with bodies of the same or different liquid hydrocarbons. In other words, the concentrate formed by dissolving the addition agent in a particular hydrocarbon may be dissolved or admixed with another hydrocarbon. In this way advantages of increased solubility may be realized as well as other advantages flowing from the combination of the constituents named. For example, it is within the contemplation of our invention to add to a light hydrocarbon fraction such as gasoline or Diesel fuel, minor amounts of a heavier liquid hydrocarbon such as refined mineral lubricating oil to which has been added a minor amount of the addition agents which characterize the present invention. Such combination, i. e., a major proportion of gasoline to which has been added a minor amount of a mineral oil of lubricating viscosity for internal combustion engine use, along with a minor amount of the addition agents which characterize the present invention, produces a fuel for internal combustion engines which is particularly desirable for use on account of the nature of the deposits left by the fuel in the combustion chamber, as well as the general performance of the fuel.

For proper results, when the compounded relatively heavier liquid hydrocarbon is essentially mineral oil having a viscosity of from about 50 to about 250 seconds Saybolt Universal at 100° F., such composition should be added to the usually lighter hydrocarbon fuel of the type boiling within the gasoline range in quantities varying from .05% to 1.50% by volume. The amount of compounded heavier hydrocarbon added to the lighter hydrocarbon fuel for optimum results will be found to be in the vicinity of .30%, i. e., in the range of from about 0.15% to 0.60%.

It will be observed that certain of the new materials mentioned above may be generally classified as follows:

I (1) $(OH)_2P-OR'COOR^2$ (2) 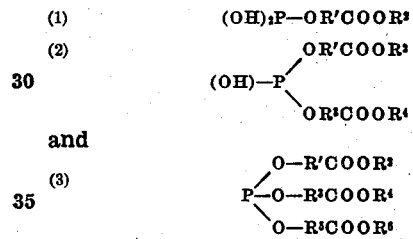

and (3) 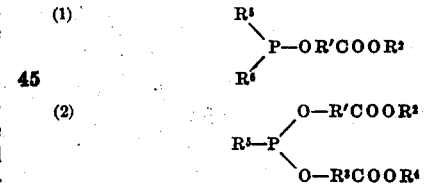

where R', $R^3$ and $R^5$ are organic radicals; and $R^2$, $R^4$ and $R^6$ are organic radicals, hydrogen, a metal, or a metallic radicle.

II (1) 
$$\begin{array}{c} R^5 \\ \diagdown \\ \quad P-OR'COOR^2 \\ \diagup \\ R^5 \end{array}$$

(2) 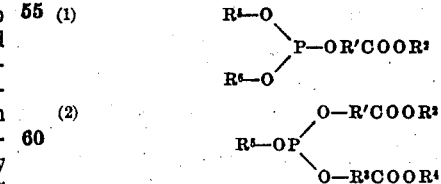

where R', $R^3$, $R^5$ and $R^6$ are organic radicles and $R^2$ and $R^4$ are organic radicles, hydrogen, a metal, or a metallic radicle.

III (1)
$$\begin{array}{c} R^5-O \\ \diagdown \\ \quad P-OR'COOR^2 \\ \diagup \\ R^6-O \end{array}$$

(2)
$$R^5-OP \diagup \begin{array}{c} O-R'COOR^2 \\ \diagdown O-R^3COOR^4 \end{array}$$

where R' and $R^3$ are organic radicles and $R^2$, $R^4$, $R^5$ and $R^6$ are organic radicles, hydrogen, a metal, or a metallic radicle.

This application is a continuation-in-part of applicants' co-pending applications Serial No. 260,220, filed March 6, 1939, and Serial No. 260,221, filed March 6, 1939, now Patents Nos. 2,252,675 and 2,251,953, respectively, both granted Aug. 12, 1941.

Other modes of applying the principle of our invention may be employed instead of the one explained, change being made as regards the materials employed, provided the ingredients stated by any of the following claims or the equivalent of such stated ingredients be employed.

We, therefore, particularly point out and distinctly claim as our invention:

1. As a new composition of matter, the phosphorus bearing product produced by the reaction of PCl₃ with an ester of lactic acid.

2. As a new composition of matter, the phosphorus bearing product produced by the reaction of PCl₃ with methyl lactate.

3. As a new composition of matter, the phosphorus bearing product produced by the reaction of PCl₃ with butyl lactate.

4. As a new composition of matter, the phosphorus bearing product produced by the reaction of PCl₃ with a cyclohexyl ester of lactic acid.

5. As a new composition of matter, the phosphorus bearing product produced by the reaction of PCl₃ with the methyl-cyclohexyl ester of lactic acid.

CARL F. PRUTTON.
ALBERT K. SMITH.
DELTON R. FREY.